Figure 1:
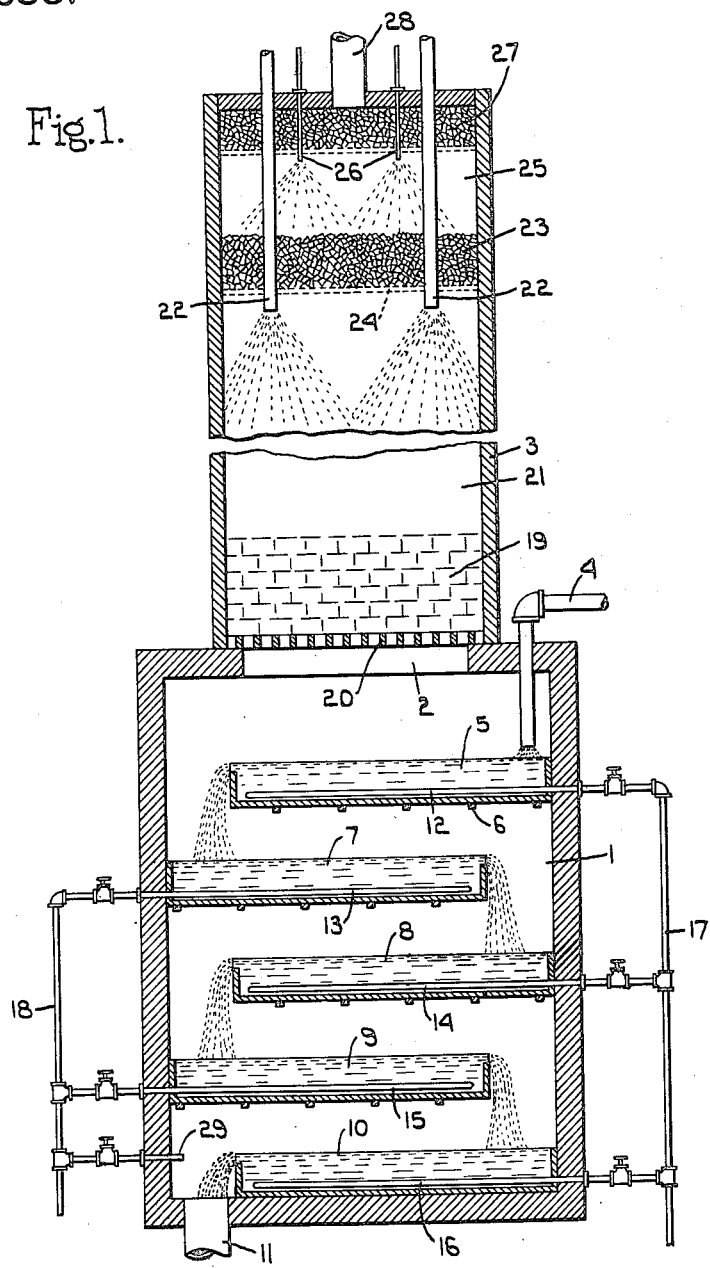

J. DAVENPORT.
BALANCED PROCESS OF EXTRACTING AND DESICCATING SULFUR DIOXID FROM SOLUTION.
APPLICATION FILED JUNE 12, 1919.

1,317,688.  Patented Oct. 7, 1919.

Inventor.
John Davenport
by Heard Smith & Tennant.
Attys.

UNITED STATES PATENT OFFICE.

JOHN DAVENPORT, OF BOSTON, MASSACHUSETTS.

BALANCED PROCESS OF EXTRACTING AND DESICCATING SULFUR DIOXID FROM SOLUTION.

1,317,688.  Specification of Letters Patent.  Patented Oct. 7, 1919.

Application filed June 12, 1919. Serial No. 303,763.

*To all whom it may concern:*

Be it known that I, JOHN DAVENPORT, a citizen of the United States, and resident of Boston, county of Suffolk, State of Massachusetts, have invented an Improvement in Balanced Processes of Extracting and Desiccating Sulfur Dioxid from Solution, of which the following description, in connection with the accompanying drawing, is a specification, like characters on the drawing representing like parts.

This invention relates to improvements in processes and apparatus for the extraction of gases from solution and the principal object thereof is to provide a process and apparatus for extracting gases from solution by maintaining an unbalanced condition of the equilibrium between the partial pressure upon the surface of and within the solution of the gas sought to be extracted whereby the gas which has been absorbed by the solution may be expelled and collected.

More specifically the invention relates to an improved process and apparatus for the extraction of sulfur dioxid from an aqueous solution, the sulfur dioxid preferably being thus extracted at substantially atmospheric pressure.

A further object of the invention is to provide a novel process and means for desiccating and cooling the gas thus extracted so that the final product will be in a substantially pure condition and delivered at a predetermined density.

Another object of the invention consists in cooling the extracted gas by subjecting it to the influence of vaporizing liquid of the same character as the gas which is extracted.

It is well known that water and other solutions will absorb gases and that at any given temperature of the solution one volume of the solvent will absorb a definite number of volumes of any given gas. The absorption is independent of the pressure of the gas over the solvent but the pressure affects the resultant strength of the solution or liquor in that as the pressure of a gas increases the density of water of any given volume of the gas increases and the heavier the volume which the solvent absorbs the stronger will be the resulting liquor.

Water is one of the best gas solvents known and the colder the water the greater number of gas volumes which a given volume will absorb. Inversely, as the temperature of the water is increased the number of volumes of gas which it will hold is diminished. For the gas to stay absorbed in the solvent the pressure of the gas in the solvent must equal the pressure of the gas at the surface of the solvent, *i. e.*, the gas in and out of the solvent must remain in equilibrium. If this equilibrium is unbalanced the gas will either come out of the solvent or more will go into it until equilibrium is again established. This pressure of the gas over the surface of the solvent which maintains the equilibrium is known as the vapor pressure of the gas. When more than one gas is present the total pressure comprises the sum of the individual gas pressures and the pressure due to any one gas is called the "partial pressure" of that gas.

Referring to sulfur dioxid in aqueous solution to which the process and apparatus of extracting the sulfur dioxid from the solution is particularly addressed, the process comprises subjecting the aqueous solution to the action of a heating means which will reduce the gas absorbing capacity of the solution, preferably agitating the solution to facilitate the expulsion of the sulfur dioxid therefrom and finally filtering, cooling and collecting the sulfur dioxid thus expelled.

In performing this process the solution containing the sulfur dioxid desirably is subjected to successively increasing temperatures until the boiling point of the water is attained at which boiling point all sulfur dioxid will be expelled. The heat is applied to the solution desirably by injecting into the solution a jet or jets of steam which serve both to heat the solution and to cause an ebullition which will agitate it thoroughly throughout.

It will thus be seen that the process for extracting gases from solution comprises subjecting said solution to substantially atmospheric presssure successively to increased temperatures, thereby maintaining an unbalanced condition of equilibrium of the partial pressures of the gases to be extracted upon the surface and within the solution until substantially all of the gas has been expelled from the solution, said process comprising further cooling and desiccating the extracted gas until it may be delivered at a predetermined density.

Figure 2:
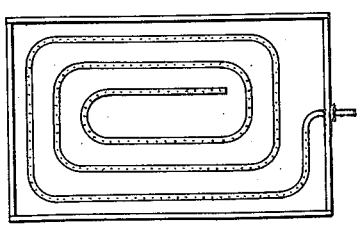

A preferred form of apparatus for accomplishing this purpose is illustrated in the accompanying drawings in which, Figure 1 is a vertical sectional view through the casing and receptacles for the solution and also through the tower in which the cooling and desiccating functions are performed, and, Fig. 2 is a plan view of one of the receptacles showing the means for supplying the jets of steam to the solution contained in said receptacle.

The preferred form of apparatus illustrated in the accompanying drawing comprises the chamber 1 which may be conveniently made rectangular in cross section, having at its upper end an opening 2 communicating with the tower 3 which is superposed upon the top wall of the chamber. A pipe or conduit 4 which desirably leads through the top wall of the chamber 1 serves to deliver the solution containing the gas to be extracted into a receptacle or pan 5 preferably of rectangular form which is supported upon suitable bars 6 extending across the chamber 1. The end wall of the receptacle 5 is slightly lower than the top of the receptacle so that the solution is discharged thereover and falls into a similar receptacle 7 which is similarly supported beneath it.

From the receptacle 7 the solution is discharged successively to other receptacles or pans 8, 9 and 10 and finally is discharged through an outlet pipe 11 after the gas has been extracted from it. It is desirable that as the solution is passed through the succesive receptacles or pans that its temperature shall be progressively increased and to accomplish this purpose means are provided for applying heat to the solution while in the pans. Any convenient means may be used to accomplish this purpose.

It is also desirable that the solution shall be agitated while being thus heated in the pans and in order to accomplish both of these results I have provided pans with perforated pipes 12, 13, 14, 15 and 16 which are conveniently formed in coils located in the bottoms of the pans, steam or other heating fluid being introduced into said pipes through mains, 17 and 18, suitable valves being provided for regulating the amount of steam thus delivered to each of the pans so that the temperature of the solution contained in them may be controlled. The steam thus furnished may be taken directly from the boiler, or the waste steam from apparatus used in the production of the sulfur dioxid may be employed.

Inasmuch as the temperature of the liquid in the successive pans is progressively higher the gas contained in the solution will be gradually expelled. In order to desiccate and cool the gas thus expelled the tower 3 is provided which contains a packing and a filter and means for subjecting the expelled gases to the influence of cooling fluids.

As illustrated herein the lower portion of the tower 3 contains a packing 19 which may be of porous brick or tile or other material supported upon a suitable grate, the material of the packing being such as to present a surface of large area upon which a film of water may be presented to the vapors ascending through said tower.

A chamber 21 preferably is provided above the packing into which water is introduced in the form of sprays 22 which play upon the packing so as to distribute films of water uniformly over the surface of the packing. The vapor rising from the chamber 1 contains not only sulfur dioxid but also a considerable amount of aqueous vapor. As these combined vapors pass through the packing the aqueous vapor is condensed by the film of water flowing over the material of the packing and is removed from the ascending column of vapor so that the sulfur dioxid which emerges from the packing has been desiccated to a great extent when it reaches the chamber 21.

A filter 23 which may be formed of pieces of stone or charcoal presenting surfaces of considerable area for condensing the moisture from the gas desirably is supported upon a suitable grating 24 above the chamber 21 so that the aqueous content of the gases passing through this filter will be condensed, thus further desiccating the gas to be collected.

Above the filter 23 a chamber 25 is provided to which is delivered vaporizing liquefied gas corresponding to that which is being collected. The expansion of said gas in vaporizing serves to cool and densify the extracted gas which then passes through a final filter 27 and thence through an outlet pipe 28 to a suitable condenser or compressor by means of which the gas may be liquefied. Any other suitable cooling medium or refrigerating device may be utilized for the purpose of reducing the temperature of the gas which is to be collected and removing the moisture content therefrom.

Referring more particularly to the process of extracting sulfur dioxid from an aqueous solution which may be obtained by any usual manner from the by-products of smelters and other plants in which sulfur is burned, the solution containing sulfur dioxid preferably is first heated while passing through a heat exchanger placed before the separating apparatus and is delivered through the inlet pipe 4 of the apparatus at a temperature of approximately 200° F. At this temperature the vapor pressure of water vapor over water is equal to 11.53 pounds per square inch. Now since the sulfur dioxid in the water was absorbed by the water when it was cold and therefore capable of absorbing a large number of volumes of sulfur dioxid gas it is incapable of holding such a large number of volumes at 200° F. Therefore the sulfur dioxid will immediately start coming out of the solution until it has a vapor pressure of 3.02 pounds per square inch when its equilibrium point is reached.

The air which also is held in the solution will likewise be expelled until it reaches its vapor pressure of 0.15 pound per square inch which is its point of equilibrium. The combined vapor pressures therefore in a total gas pressure upon the surface of the solution of 14.70 pounds per square inch at which pressure a balanced condition exists between the pressure upon the surface of the solution and the gaseous content of the solution. The gases thus expelled rise gradually through the packing and filter and pass to the condenser (not shown) without requiring the use of a pump, fan or other mechanical means for assisting their flow than the action of the condenser itself.

The heat applied through the coil 12 will maintain the temperature of the solution in the pan or receptacle 5 at substantially 200° F. and the escaping steam will cause such agitation as will facilitate the expulsion of the gases from the solution until the balance of partial pressure of the gases being extracted is attained. The solution discharging from the receptacle 5 enters the receptacle 7 where it is further heated, preferably to a temperature of 203° F. which causes again an unbalancing of the partial pressures of the gases upon the surface of and within the solution causing the expulsion of more of the sulfur dioxid.

The solution then passes from the pan 7 to the pan 8 where this temperature is further raised by a similar means to a temperature preferably of 206° F.

Advancing from the pan 8 the solution is again subjected to heat and agitation until the temperature of the solution reaches preferably 209° F. again causing an unbalancing of the partial pressures and the expulsion of more of the sulfur dioxid. Finally the solution is delivered from the pan 9 to the pan 10 where the solution is raised to the boiling point of water or 212° F. at which temperature all or substantially all of the sulfur dioxid gas will be expelled.

The passages for the gas over and around the successive pans should be so designed that the gas velocity shall be such that at any particular point the density of the sulfur dioxid will be slightly less than the density it should have to maintain in equilibrium the partial pressure of the sulfur dioxid upon the surface of and in the solution.

When this is attained each cubic foot of the gas moving out through the opening 2 into the tower will contain its maximum weight of sulfur dioxid gas while if the velocity with which the sulfur dioxid gas flows from the pan to the tower is too rapid each cubic foot of the combined gas will be deficient in sulfur dioxid while carrying its maximum weight of water vapor.

It is however desirable that the maximum amount of sulfur dioxid shall be contained in each cubic foot of gas so that the required desiccation of the gas may be reduced to a minimum.

It will be understood that the number of pans and the temperatures to which the solution is raised in each one above specified are illustrative and that a greater number or fewer pans may be employed as may be found necessary or desirable and that the temperature in the respective pans may be modified accordingly.

The combined hot gases which have been expelled from the solution, i. e. water vapor and sulfur dioxid, and the air rises upwardly through the grating 20 and packing 19 into the chamber 21 where they are subjected to the sprays 22 of cooling water, preferably at a temperature of about 60° F. The water vapor in the space above the packing will assume the temperature of the incoming cool water and the water vapor in this chamber will then have a vapor pressure of .025 pound per square inch. The sulfur dioxid gas will gradually be accumulated and desiccated as it rises through the packing and will shrink in volume, becoming more dense until it finally reaches a vapor pressure of approximately 14.020 pounds per square inch in the chamber 21. The water from the sprays will be gradually heated as it encounters the rising gases and as it passes through the packing 19 until it has assumed approximately a temperature of 200° F. when it drops into the pan 5 to which the solution containing the sulfur dioxid is supplied.

The gases then rise through the filter 23 which desirably is of fine coke which serves to remove the water particles, which are in the form of a fog or mist, from the sulfur dioxid gas which then flows into the chamber 25 where it is subjected to the action of sprays of liquid sulfur dioxid which is delivered through any suitable form of expansion valve.

As the liquid sulfur dioxid changes from the liquid form to the gaseous state it absorbs rapidly the heat of the gaseous sulfur dioxid thereby lowering the temperature of the combined gases in the chamber 25. By suitably regulating the amount of liquid sulfur dioxid thus supplied any desired temperature may be obtained in this upper chamber. This chamber should be made of sufficient size to allow for a thorough mixing of the expanding sulfur dioxid which is delivered through the sprays 26 and the combined volumes of such gases with those delivered from the lower chambers. The gases in the upper chamber then pass through the filtering medium 27 which likewise may be of fine coke to the exit pipe. This last filter 27 serves to remove all water particles so that the gas which is delivered through the discharge pipe 28 will be the cold dry sulfur dioxid gas.

Instead of delivering live steam directly to the successive pans within the chamber 1 a similar effect may be produced by discharging a jet of live steam through a pipe or pipes 29 located in the lower portion of the chamber 1. But by thus supplying the heat the beneficial effect of agitation caused by the jets of live steam projecting into the solution will be lost. Likewise other means for supplying heat to the solution in the pans which may be employed will lack this desirable function unless means are provided for suitably agitating the solution.

It will be understood that various other forms of vaporizing apparatus may be used however and that other heating and agitating mediums such as hot air, may be employed in the place of steam or in conjunction with it.

Having thus described my invention what I claim as new and desire to secure by Letters Patent is:

1. The process of extracting gas from solution which comprises repeatedly subjecting the solution in open receptacles, at substantially atmospheric pressure to successively increased temperatures, thereby causing an unbalanced condition of the equilibrium of the partial pressures of the gases upon the surface of and within the solution and thereafter for collecting the gases as expelled from the solution.

2. The process of extracting gas from solution which comprises repeatedly subjecting the solution in open receptacles, at substantially atmospheric pressure to successively increased temperatures thereby causing an unbalanced condition of the equilibrium of the partial pressures of the gases upon the surface of and within the solution, cooling and desiccating said gases and finally collecting the same.

3. The process of extracting sulfur dioxid from an aqueous solution which comprises repeatedly subjecting said solution in open receptacles, at substantially atmospheric pressure to successively increased temperatures, thereby maintaining an unbalanced condition of the equilibrium of partial pressure of the gaseous sulfur dioxid upon the surface of and within the solution until substantially all the sulfur dioxid has been expelled from the solution and subjecting the vapor expelled from said solution to a cooling and desiccating agent.

4. The process of extracting sulfur dioxid from an aqueous solution while contained in an open receptacle which consists in maintaining the solution in a state of agitation in said receptacle and subjecting the solution while at substantially atmospheric pressure to successively increased temperatures, thereby maintaining an unbalanced condition of the equilibrium of the partial pressure of the gaseous sulfur dioxid upon the surface of and within the solution.

5. The process of extracting sulfur dioxid from an aqueous solution which consists in subjecting said solution at substantially atmospheric pressure to successively increased temperatures by means of jets of heated fluid under pressure which will simultaneously transmit heat to said solution and cause an ebullition thereof.

6. The process of extracting sulfur dioxid from an aqueous solution which consists of passing said solution successively through a series of superposed open receptacles maintained at progressively high temperatures by jets of steam injected into the liquid in said receptacles adapted to influence the equilibrium of the partial pressure of the gaseous sulfur dioxid upon the surface and within the solution.

7. The process of extracting sulfur dioxid from an aqueous solution which consists of passing said solution through a series of superposed open receptacles maintained at progressively high temperatures adapted to influence the equilibrium of the partial pressure of the gaseous sulfur dioxid upon the surface and within the solution and progressively cooling the sulfur dioxid as it is expelled from the solution.

8. A process of extracting sulfur dioxid from an aqueous solution which consists in passing said solution successively through a series of open receptacles maintained at progressively higher temperatures adapted to influence the equilibrium of the partial pressure of the gaseous sulfur dioxid upon the surface and within the solution and subjecting the sulfur dioxid thus expelled to the action of a cooling agent.

9. The process of extracting sulfur dioxid from an aqueous solution which consists in passing said solution through a series of superposed open receptacles maintained at progressively high temperatures adapted to influence the equilibrium of the partial pressure of the gaseous sulfur dioxid upon the surface and within the solution and subjecting the sulfur dioxid thus expelled to the action of sprays of a cooling agent.

10. The process of extracting sulfur dioxid from an aqueous solution which consists of passing said solution through a series of superposed open receptacles maintained at progressively high temperatures adapted to influence the equilibrium of the partial pressure of the gaseous sulfur dioxid upon the surface and within the solution subjecting the gaseous sulfur dioxid to the cooling action of sprays of water and of vaporizing sulfur dioxid.

11. The process of extracting sulfur dioxid from an aqueous solution which consists in causing the solution to flow progressively through a series of open receptacles, increasing the temperature of said solution in the successive receptacles through which it flows whereby the equilibrium of the partial pressure of the gas to be extracted upon the surface and within the solution will be influenced in successive steps and the gases in solution liberated, and subjecting the vapor from said solution successively to the action of thin films of water and to the action of a cooling agent comprising vaporizing sulfur dioxid.

In testimony whereof, I have signed my name to this specification.

JOHN DAVENPORT.